3,132,112
AMMONIA-EPICHLOROHYDRIN RESINS

Frank A. Bartolomeo, Westerly, R.I., and Robert E. Heffner, Lake Jackson, Tex., assignors to The Dow Chemical Company, Midland, Mich., a corporation of Delaware
No Drawing. Filed Sept. 25, 1959, Ser. No. 842,223
7 Claims. (Cl. 260—2.1)

This invention relates to an improved process for making ammonia-epichlorohydrin resins.

It is known that ammonia readily condenses with epichlorohydrin to form solid, insoluble and infusible resins having useful ion-exchange properties. According to the methods heretofore known, aqueous ammonia and epichlorohydrin were mixed, thus forming a resinous product that was at first soluble but later separated as a massive block of hard, tough resin which required comminution before its ion-exchange properties could be utilized. Such comminution not only increased the cost of the product but resulted in particles of highly irregular shapes and widely divergent sizes. Such particulate resin has impaired utility because of its packing tendencies and poor fluid flow properties in ion-exchange applications.

It is an object of this invention to provide methods for making ammonia-epichlorohydrin ion-exchange resins in substantially spherical particles of desirable size without necessity of any comminution step. Another object is to provide such resins. Other objects will appear hereinafter.

According to the invention, ammonia-epichlorohydrin resins in the form of substantially spherical granular particles of desirable size are produced by reacting ammonia and epichlorohydrin in an inert, volatile, organic solvent, at a temperature of about 60–180° C., under substantially anhydrous conditions and in a molar ratio of about 0.5 to 2 moles of epichlorohydrin per mole of ammonia. The particle size is readily controlled within wide limits by the relative volume of solvent used and the rate of agitation of the mixture during reaction, or both.

By "substantially spherical" we mean that a high proportion of the particles are of a generally spherical shape; i.e., they may be spherical, oblate spheroidal, prolate spheroidal, egg-shaped, pear shaped or the like. By "inert solvent" we mean one that does not react chemically with either ammonia or epichlorohydrin so as to interfere with the desired reaction under the conditions of the process. By "volatile solvent" we mean one that is sufficiently volatile that it can readily be vaporized from the resin at a temperature at which the resin is stable; i.e., it has a boiling point not higher than about 150° C.

The preferred solvents are the aromatic hydrocarbons, such as benzene, toluene and xylene. The ethers, such as diethyl ether, diisopropyl ether and dioxane are also satisfactory. The more polar solvents, such as ketones and lower alkanols, are less suitable because of their affinity for ammonia. Thus, the lower primary alkanols, especially methanol and ethanol, yield inferior products.

The practice of the invention is illustrated by the following examples.

Example I

In a pressure vessel equipped with temperature control and stirring mechanism, 2 moles of $NH_3$ was dissolved in consecutive runs in 200 milliliters of benzene, toluene, isopropyl ether, isopropyl alcohol, tetiarybutyl alcohol, xylene or dioxane. At 40 to 60° C. and with effective agitation epichlorohydrin was added until 1 mole passed into the solution. Digestion was carried out over a one hour period and the temperature was then raised to 110° C. Digestion was continued for another hour. The reaction mixture was allowed to cool and the product was removed by filtration and washed with water. The granular polymer was then dried and was ready for use.

Example II

Into a 10 gallon kettle was placed 8 pounds of epichlorohydrin and 2½ pounds of ammonia along with three gallons of toluene. The mixture was heated to 110° C. and the reaction started at slightly over 100° and the exotherm from the reaction carried the temperature to 153° C. There was a 9¼ pound yield of granular polymer from the mixture which is 90% of theoretical.

Example III

Into a 100 gallon kettle was placed 80 pounds of epichlorohydrin and 30 gallons of toluene. Ten pounds of ammonia was added and the mixture was brought to 100° C. The exotherm from the reaction raised the temperature of the reactants to 180° C. The resulting material was somewhat yellowed by an excess exotherm in the reaction. However, the material had ion exchange activity equal to similar products produced from this reaction at lower temperatures and thus not discolored.

Example IV

The same 100 gallon kettle was charged with the same amount of toluene and epichlorohydrin as was used in Example III. The amount of ammonia was increased to 25 pounds. The kettle pressure went to 198 pounds per square inch gauge and the temperature rose to 150° C. The product was slightly yellowish; however, a good uniform particle size distribution was obtained and the resin was of good physical strength. The particles were very difficult to break or tear apart by any means.

Example V

Into a dry 10 gallon stainless steel kettle was placed three gallons of toluene and 8 pounds of epichlorohydrin. The temperature was then raised to 105° C. Ammonia was added in increments so as to control the kettle pressure to 30 to 50 pounds per square inch gauge pressure. 3⅓ pounds of ammonia was required. The resulting product was small spherical particles of very light colored, desirable material.

Example VI

The procedure of Example IV was used except that small amounts of ammonia were added over three hours and twenty-five minutes while maintaining a temperature of 105° C. After adding a total of 3½ pounds a product resulted which was almost perfectly white and consisted of discrete spherical particles which were tested and found effective for ion exchange activity. Also analysis showed the nitrogen content was 12.55% and the chlorine content was 12.8%.

Example VII

The products from four different batches of resin, made by use of various proportions of $NH_3$ feed, were compared for anion exchange activity.

The resins had a particle size of 100% thru #12 screen, 3% on #20 screen, 83% on #40 screen, 11% on #60 screen, 3% thru #60 screen. They were treated with aqueous NaOH, washed and dried. Their capacity to hold nitrate, sulfate and phosphate ions were then measured and found to be substantially identical.

Example VIII

The effect of rate of agitation on the particle size of the product is shown by two otherwise identical experiments in which epichlorohydrin and ammonia were condensed as in Example I, in the first of which the stirrer was operated at 40 r.p.m. while in the second the stirrer was operated at 100 r.p.m. The granular products were screened for size, the results being as follows:

| Screen Size | Percent Retained | |
|---|---|---|
| | 40 r.p.m. product | 100 r.p.m. product |
| 6 | 0.9 | 0 |
| 12 | 2.9 | 0 |
| 20 | 72.7 | 23.6 |
| 40 | 22.0 | 72.2 |
| 70 | 2.9 | 0 |

It is apparent from the above data that smaller and more uniform particles are produced at the higher rate of agitation. By use of extremely vigorous agitation during the reaction period it is possible to make the resin in the form of a fine granular powder while by use of slow, gentle agitation the resin may be obtained in coarser bead form. In either case, the particles are largely spherical in shape, thus being especially suitable for use in ion-exchange beds because of their large free-space and their non-packing nature. Moreover, they have exceptionally high ion-exchange capacity.

While certain specific molar ratios of epichlorohydrin to ammonia have been set forth herein, when the resin is made by passing one reactant into a solution of the other in an inert solvent the product precipitates in granular form during the addition of the second reactant and thus one cannot specify any particular ratio of reactants during this process. At first there is a huge excess of the first reactant but toward the end of the reaction there may be an excess of the second. The preferred ratio in which the materials actually react is about 1.5 moles of epichlorohydrin per mole of ammonia.

The resins of the invention are substantially inert to most strong acids and bases, organic solvents and water.

We claim:
1. A process for preparing in granular form a weakly basic anion-exchange resin containing polar amino groups, which process comprises reacting by contacting ammonia and epichlorohydrin in a substantially anhydrous, inert organic solvent selected from the group consisting of monocyclic aromatic hydrocarbons, ethers, isopropyl alcohol and tert.-butyl alcohol.
2. A process as defined in claim 1 wherein the solvent is a monocyclic aromatic hydrocarbon.
3. A process as defined in claim 1 wherein the solvent is benzene.
4. A process as defined in claim 1 wherein the solvent is toluene.
5. A process as defined in claim 1 wherein the solvent is dioxane.
6. A process as defined in claim 1 wherein the reaction temperature is about 100–150° C.
7. A process as defined in claim 1 wherein about 1 to 1.5 moles of epichlorohydrin per mole of ammonia is used.

References Cited in the file of this patent

UNITED STATES PATENTS

| 2,104,092 | Munz | Jan. 4, 1938 |
| 2,898,310 | Greer | Aug. 4, 1959 |

FOREIGN PATENTS

| 771,836 | France | Oct. 18, 1934 |

OTHER REFERENCES

Helfferich: Ion Exchange, page 50 and page 69 (1962), McGraw-Hill, New York.

Darmstaedter: Annalen der Chemie und Pharmacie, volume 148, pages 124–125 (1868).